(12) United States Patent
Kozarekar et al.

(10) Patent No.: US 7,503,871 B2
(45) Date of Patent: Mar. 17, 2009

(54) STRATEGY FOR IMPROVING SHIFT QUALITY IN A HYBRID ELECTRIC VEHICLE POWERTRAIN

(75) Inventors: Shailesh Kozarekar, Novi, MI (US); Stephen Burke, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 11/467,588

(22) Filed: Aug. 28, 2006

(65) Prior Publication Data

US 2008/0051248 A1 Feb. 28, 2008

(51) Int. Cl.
*B60W 1/02* (2006.01)
(52) U.S. Cl. .......................... 477/3; 477/107
(58) Field of Classification Search .............. 477/3, 477/107
See application file for complete search history.

(56) References Cited

U.S. PATENT DOCUMENTS

| | | | |
|---|---|---|---|
| 5,453,930 A | 9/1995 | Imaseki et al. | |
| 5,641,031 A | 6/1997 | Riemer et al. | |
| 6,253,140 B1 | 6/2001 | Jain et al. | |
| 6,295,487 B1 | 9/2001 | Ono et al. | |
| 6,364,807 B1 | 4/2002 | Koneda et al. | |
| 6,585,066 B1 | 7/2003 | Koneda et al. | |
| 6,600,980 B1 | 7/2003 | Kraska et al. | |
| 7,185,722 B1 * | 3/2007 | Sakamoto et al. | 180/65.2 |
| 7,216,943 B2 * | 5/2007 | Nishikawa et al. | 303/152 |
| 7,227,332 B2 * | 6/2007 | Suzuki et al. | 320/104 |
| 2005/0009665 A1 | 1/2005 | Cho | |
| 2005/0109550 A1 | 5/2005 | Buglione et al. | |

* cited by examiner

*Primary Examiner*—Ha D. Ho
(74) *Attorney, Agent, or Firm*—David B. Kelley; Brooks Kushman P.C.

(57) ABSTRACT

The hybrid electric vehicle powertrain includes an internal combustion engine and two electric machines, one electric machine being connected directly to an engine power output shaft and to a multiple-ratio transmission power input shaft. A second electric machine powers front vehicle traction wheels as the engine powers rear traction wheels during a transmission shift interval.

8 Claims, 3 Drawing Sheets

STRATEGY FOR IMPROVING SHIFT QUALITY IN A HYBRID ELECTRIC VEHICLE POWERTRAIN

BACKGROUND OF THE INVENTION

1. Field of the Invention

The invention relates to a hybrid electric vehicle powertrain with an engine, a multiple-ratio power transmission mechanism and an electric motor.

2. Background of the Invention

In a conventional automatic transmission for a road vehicle, the automatic transmission has multiple ratios, friction clutches and brakes to establish and disestablish multiple speed ratios in transmission gearing to maintain a desired engine speed and torque relationship and to achieve maximum engine performance throughout a range of vehicle speeds and varying torque requirements as the operating conditions for the vehicle change. The transmission clutches and brakes are engaged and released during a ratio shift. Engine torque is reduced at the beginning of a ratio shift event so that the friction clutches and brakes can be engaged and disengaged without excessive heat generation while minimizing undesirable inertia torque disturbances due to changes in angular velocity of the rotating mass of the transmission and powertrain elements involved in a ratio shift. Engine torque is reduced during a ratio shift by temporarily defueling the engine or, in the case of a spark ignition engine, by retarding ignition timing. As the shift progresses toward completion, the engine torque is restored.

If the automatic transmission includes a hydrokinetic torque converter with an impeller and a turbine connected respectively to the engine and a torque input element of transmission gearing, a torque converter bypass clutch may be used to bypass the hydrokinetic torque flow path by connecting the impeller to the turbine. If a shift occurs while the torque converter bypass clutch is engaged, the bypass clutch may be opened or partially opened to achieve an appropriate clutch slip during a transmission ratio shift interval. This is another well known technique for reducing inertia torque disturbances and improving a so-called quality of the ratio shift in the vehicle powertrain. A typical powertrain with a torque converter and a bypass clutch of this type may be seen by referring, for example, to U.S. Pat. No. 6,253,140.

An example of a hybrid electric vehicle powertrain that includes a traction motor and a transmission with multiple-ratio gearing is shown in U.S. Pat. No. 6,585,066. The powertrain of the '066 patent does not include a hydrokinetic torque converter, but it includes a slipping wet clutch between the rotor of an electric traction motor and the crankshaft of an internal combustion engine. The rotor is connected directly to torque input elements of a multiple-ratio transmission.

During a ratio shift of the powertrain of the '066 patent, the clutch may be slipped during a ratio change thereby attenuating inertia torque fluctuations in the powertrain resulting from changing angular velocity of the elements of a transmission that are involved in the ratio shift. This technique, as well as the technique described above, will provide better subjective shift quality, sometimes referred to as shift feel, which is detectable by the vehicle operator.

A powertrain such as that disclosed in the '066 patent relies upon the rotary kinetic energy of the rotor of the electric motor. Typically, the powertrain would have a single motor to complement engine power.

SUMMARY OF THE INVENTION

The powertrain of the present invention has a dual drive operating mode. It includes an internal combustion engine with a crank-integrated starter-generator directly attached to the crankshaft of the engine. Unlike the design of the '066 patent, there are no clutches between the integrated starter generator and the engine. The output power of the engine and the crank-integrated starter-generator is connected to the torque input element of a multiple-ratio automatic transmission.

An electric traction motor is mounted on the axis of the front traction wheels of a vehicle. The rotor of the front wheel-mounted electric traction motor is mechanically connected to the front traction wheels through front wheel drive axles. The torque output element of the multiple-ratio transmission is drivably connected to rear vehicle traction wheels through a driveshaft and a differential-and-axle assembly in the usual fashion.

The crankshaft-integrated starter-generator is drivably connected directly to the engine crankshaft and to the torque input element of an automatic transmission. The electric motor mounted on the front traction wheel axis is connected electrically to the crankshaft-integrated starter-generator and to a high voltage battery, which may be a nickle metal hydride battery.

The torque developed by the motor mounted on the front traction wheel axis is increased at the initiation of a ratio change in the transmission. The motor torque is ramped up to counteract or compensate for the usual torque reduction of the engine during a transmission ratio shift. This balances the overall torque delivery to the traction wheels and improves shift quality.

PARTICULAR DESCRIPTION OF AN EMBODIMENT OF THE INVENTION

Figure 1:
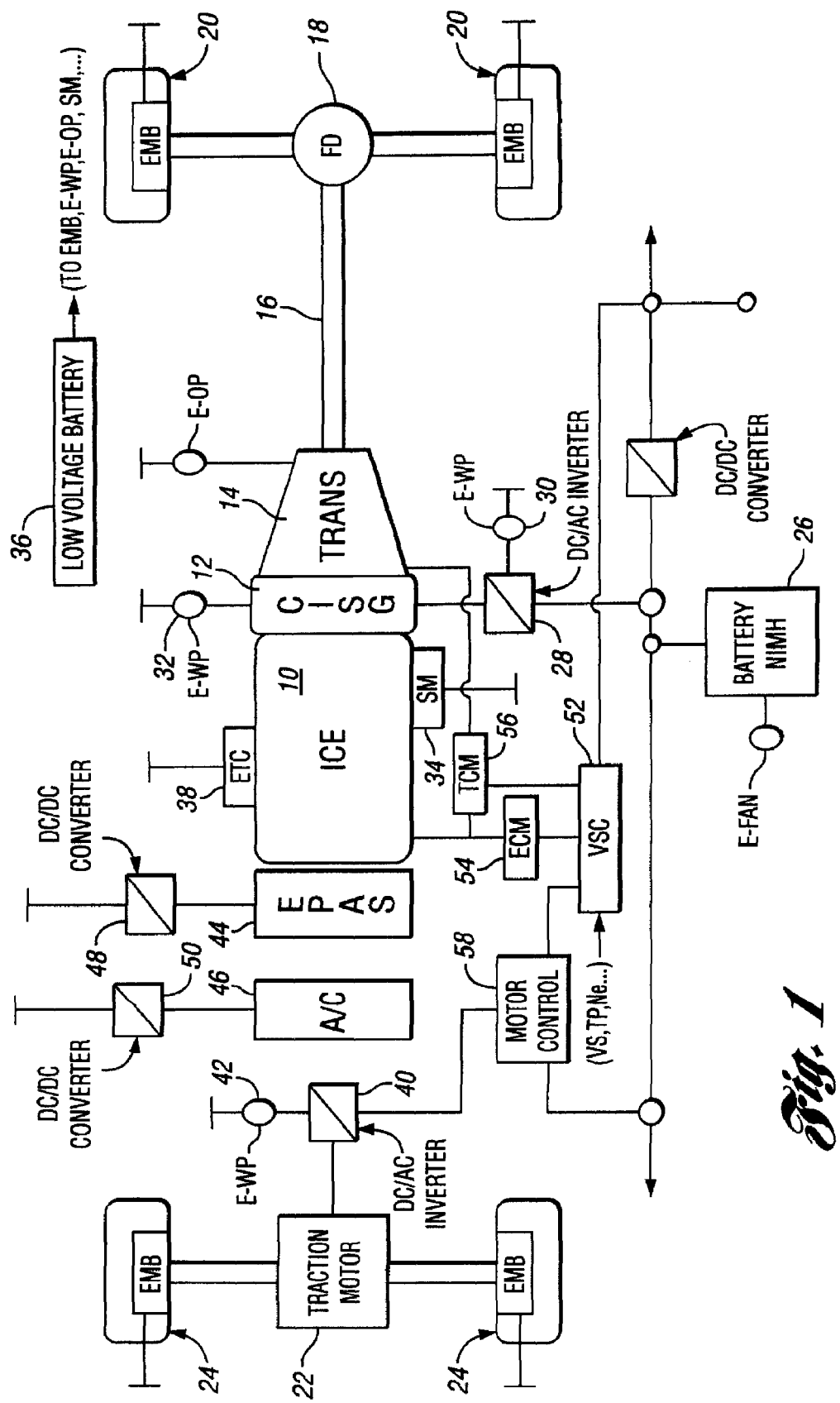
FIG. 1 is a schematic system diagram of a powertrain for an automotive vehicle that includes the invention.

In the powertrain illustrated in FIG. 1, an internal combustion engine (ICE) is shown at 10. The rotor of a crankshaft-integrated starter-generator (CISG), as shown at 12, is situated between the engine 10 and a multiple-ratio automatic transmission 14. The torque output end of the transmission 14 is connected through a driveline, including driveshaft 16, to a final drive differential-and-axle assembly 18 for delivering torque to traction wheels 20. Unlike the powertrain illustrated in the '066 patent, where a clutch is used to connect the engine crankshaft to the rotor of an electric machine, the rotor of the generator 12 is connected directly to the crankshaft of the engine 10 and to the torque input shaft of the transmission 14.

A traction motor, which may function as a generator to develop regenerative torque during a vehicle coast mode, is shown at 22. It includes a rotor drivably connected through front axle shafts to front traction wheels 24. Each of the traction wheels 20 and 24 may include an electromagnetic brake (EMB), as shown in FIG. 1. The generator 12 and the motor 22 are electrically coupled to a high voltage battery 26, which may be a nickle metal hydride battery. A first DC/AC inverter 28 is in the electrical connection between battery 26 and the generator 12 for converting DC electrical energy to AC electrical energy. Electric motor-powered water pumps 32 for cooling the high voltage circuit for the battery 26 and generator 12 are shown at 30 and 32. The starter motor (SM) shown at 34 may be used to start the engine if the high voltage system is shut down or if additional starting torque is required due to cool engine operating temperatures, for example. The starter motor 34 is powered by a low voltage battery 36. An engine electronic throttle control 38, as well as the water pumps 30 and 32 also are powered by the battery 36.

The high voltage battery 26 is electrically coupled to the traction motor 22 by a second DC/AC inverter 40. A water pump 42, which also is powered by the battery 36, provides coolant to the traction motor 22 and to the inverter 40.

An electronic power assist steering mechanism (EPAS) and an air conditioning system (AC), including a low voltage motor for driving a compressor, are shown at 44 and 46, respectively. The low voltage battery 36 powers the electromagnetic brakes (EMB) for the traction wheels, as well as DC/DC converters 48 and 50 for the power steering system 44 and the air conditioning system 46.

The powertrain includes a vehicle system controller 52, which coordinates control functions of an engine control module 54 and a transmission control module 56. The vehicle system controller responds to input variables, such as vehicle speed, throttle position, engine speed, engine coolant temperature, etc.

Shown at 58 is a motor control module for controlling the front, traction wheel-mounted, traction motor 22. It is electrically coupled to the DC/AC inverter 40, as shown.

Figure 2:
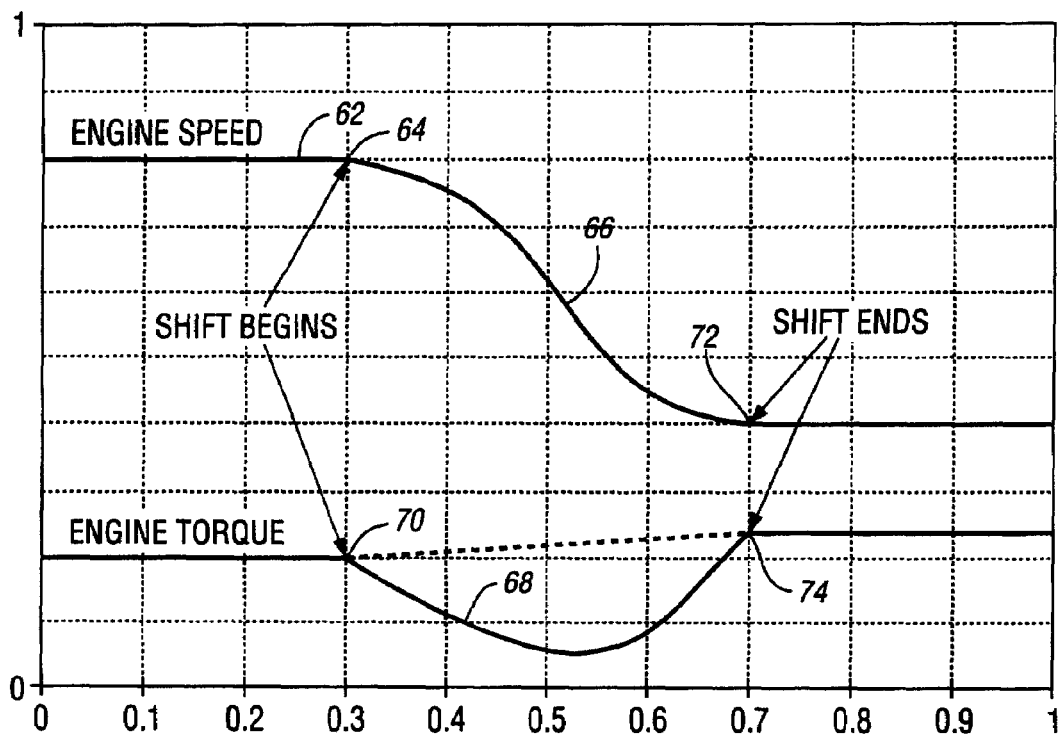
FIG. 2 is a time plot of engine speed and engine torque in a powertrain for a vehicle having a transmission of the type shown in the '140 patent.

FIG. 2 is a plot of engine speed and engine torque versus time for a conventional transmission, such as the transmission shown in the '140 patent. The shift event plotted in FIG. 2 is an upshift in which the engine speed is at a relatively high value, as shown at 62. At the beginning of the upshift, the fueling of the engine can be reduced, in the case of the fuel injected engine, at point 64 in the plot of FIG. 2. It is at that instant that the upshift begins. As the fueling decreases, as shown at 66, the engine torque decreases, as shown at 68. The engine torque decrease begins at point 70, which corresponds to the engine speed change beginning at point 64. At the end of the shift, the engine speed is reduced to the value shown at 72 in the plot of FIG. 2. The corresponding engine torque is ramped up during the shift interval until it reaches a restored value, as shown at 74 in the plot of FIG. 2.

Figure 3:
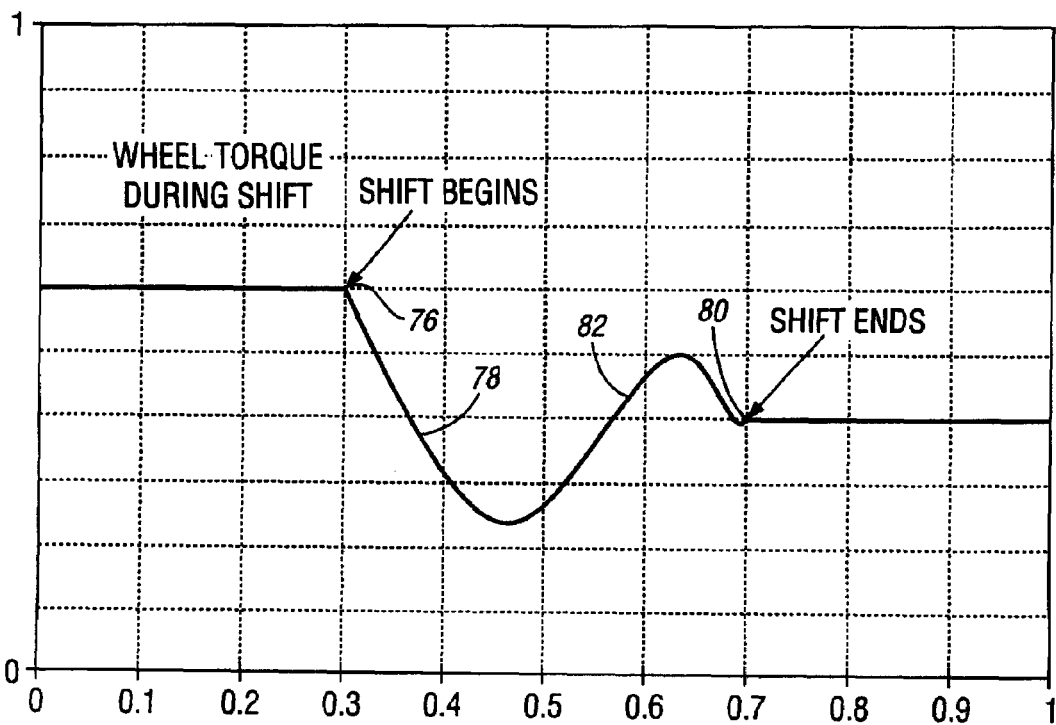
FIG. 3 is a time plot showing changes in wheel torque for a conventional powertrain during a shift interval.

The wheel torque at the beginning of a shift, shown at point 76 in FIG. 3, will decrease, as shown at 78. Due to the reduction in engine torque between the initiation of the shift at 76 and the end of the shift at point 80, the effective wheel torque will fluctuate, as shown at 82 due to the dynamics of the driveline. It is this variation in wheel torque that results in an undesirable shift feel. This problem is overcome by the invention.

Figure 4:
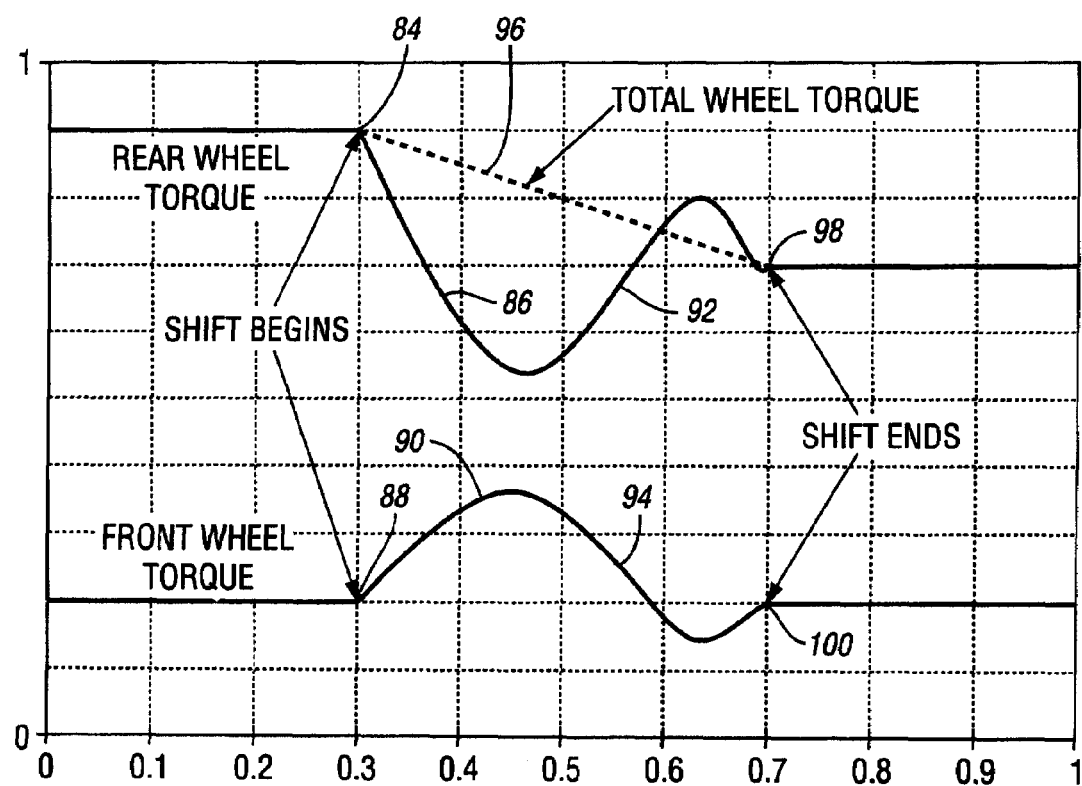
FIG. 4 is a time plot of rear wheel torque, front wheel torque and total wheel torque during a shift interval for the powertrain of the invention illustrated in FIG. 1.

FIG. 4 shows a plot of rear wheel torque and front wheel torque during an upshift for a driveline that embodies the invention illustrated schematically in FIG. 1. At the beginning of an upshift at point 84 in FIG. 4, the engine torque is reduced by partially defueling the engine, which causes a reduction in rear wheel torque, as shown at 86. In the case of a powertrain having a spark-ignition engine, an engine torque reduction during a ratio shift can be achieved also by retarding the engine spark timing. Simultaneously with a reduction in rear wheel torque, the traction motor 22 is activated at point 88. The motor torque gradually is increased by the motor control 58 to effect a ramping up of traction motor torque at the front traction wheels, as shown at 90.

The transmission control module, the engine control module and the vehicle system control module coordinate front wheel traction motor power, together with the motor control 58, so that front wheel torque will fluctuate in a generally oscillating pattern that emulates the rear wheel torque fluctuation pattern at 86. Rear wheel torque initially decreases and then fluctuates with a positive slope, as shown at 92. The torque fluctuations for the engine and for the motor result in torque fluctuations at the front and rear wheels that are out of phase as shown in FIG. 4. In the time period of the shift interval during which the front wheel torque is commanded to decrease, as shown at 94, the total wheel torque is the sum of the rear wheel torque and the front wheel torque.

At any instant during the shift interval, the total wheel torque is plotted, as shown at 96. The undesirable torque fluctuations indicated in FIGS. 2 and 3 are avoided during the shift event, as demonstrated by the straight dotted line illustrated in FIG. 4. At the end of the shift event, the rear wheel torque is stabilized at point 98 and the front wheel torque is stabilized as shown at point 100.

The motor 22, during a vehicle coast mode, will function as a generator so that regenerative energy will be stored in battery 26. Likewise, generator 12 can act either as a motor or as a generator depending upon the operating mode of the vehicle (i.e., driving mode or coasting mode) and the state-of-charge of the battery 26.

Although an embodiment of the invention has been particularly described, it will be apparent to persons skilled in the powertrain art that modifications may be made without departing from the scope of the invention. All such modifications and equivalents thereof are intended to be covered by the following claims.

What is claimed:

1. A hybrid electric vehicle powertrain for a vehicle having a set of front traction wheels and a set of rear traction wheels comprising:
    an internal combustion engine;
    a multiple-ratio transmission with a torque input shaft drivably connected to a power output shaft for the engine and a power output shaft drivably connected to one of the sets of traction wheels;
    a first electric motor connected directly to the engine power output shaft whereby electric motor torque of the first electric motor complements engine driving torque and is adapted to provide engine starting torque;
    a second electric motor connected drivably to a second of the sets of traction wheels;
    a battery electrically coupled to the first and second electric motors;
    the second electric motor, during a ratio shift of the multiple-ratio transmission, providing wheel torque to the second set of traction wheels as driving torque from the engine to the first set of traction wheels is reduced during a ratio shift interval of the multiple-ratio transmission.

2. The hybrid electric vehicle powertrain set forth in claim 1 wherein the first electric motor provides driving torque to the first set of traction wheels, the torque of the first electric motor and the torque of the engine being additive as the first set of traction wheels is driven.

3. The hybrid electric vehicle powertrain set forth in claim 1 wherein the wheels of the first set of traction wheels are rear vehicle traction wheels and the wheels of the second set of traction wheels are front vehicle traction wheels.

4. The hybrid electric vehicle powertrain set forth in claim 2 wherein the wheels of the first set of traction wheels are rear vehicle traction wheels and the wheels of the second set of traction wheels are front vehicle traction wheels.

5. The hybrid electric vehicle powertrain set forth in claim 1 wherein the torque supplied to the second of the sets of driving wheels during a shift interval is substantially equal to and of opposite phase with respect to the torque supplied by the engine to the first set of traction wheels whereby the total torque delivered to the front and rear traction wheels remains substantially uniform during the shift interval.

6. The hybrid electric vehicle powertrain set forth in claim 5 wherein the wheels of the first set of traction wheels are rear vehicle traction wheels and the wheels of the second set of traction wheels are front vehicle traction wheels.

7. The hybrid electric vehicle powertrain set forth in claim 1 whereby the first electric motor functions as a generator during a vehicle driving mode to power the second electric motor;

the second electric motor functioning as a generator during a vehicle coasting mode to charge the battery.

8. The hybrid electric vehicle powertrain set forth in claim 6 wherein the first electric motor functions as a generator during a vehicle driving mode to power the second electric motor;

the second electric motor functioning as a generator during a vehicle coasting mode to charge the battery.

* * * * *